United States Patent
Han (10) Patent No.: US 9,245,188 B2
(45) Date of Patent: Jan. 26, 2016

(54) LANE DETECTION SYSTEM AND METHOD

(71) Applicant: HANWHA TECHWIN CO., LTD., Changwon-Si (KR)

(72) Inventor: Tea Won Han, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/269,335

(22) Filed: May 5, 2014

(65) Prior Publication Data

US 2015/0161454 A1    Jun. 11, 2015

(30) Foreign Application Priority Data

Dec. 11, 2013 (KR) .................. 10-2013-0154107

(51) Int. Cl.
  G06K 9/00  (2006.01)
  B60R 1/00  (2006.01)

(52) U.S. Cl.
  CPC ............. *G06K 9/00798* (2013.01); *B60R 1/00* (2013.01); *G06K 9/00476* (2013.01); *B60R 2300/804* (2013.01)

(58) Field of Classification Search
  None
  See application file for complete search history.

(56) References Cited

U.S. PATENT DOCUMENTS

| 8,611,609 | B2 | 12/2013 | Oyama | |
|---|---|---|---|---|
| 2004/0183663 | A1* | 9/2004 | Shimakage | G06K 9/00798 340/436 |
| 2005/0135658 | A1* | 6/2005 | Yamamoto | G06K 9/00798 382/104 |
| 2006/0015252 | A1* | 1/2006 | Yamamoto | G06K 9/00798 701/301 |
| 2008/0309763 | A1* | 12/2008 | Hongo | B60R 1/00 348/148 |
| 2009/0034799 | A1* | 2/2009 | Nishida | G05D 1/0244 382/104 |
| 2009/0268026 | A1* | 10/2009 | Mori | G06K 9/00798 348/148 |
| 2012/0057757 | A1* | 3/2012 | Oyama | G06K 9/00798 382/104 |
| 2012/0242835 | A1* | 9/2012 | Li | G08G 1/167 348/148 |
| 2013/0063599 | A1* | 3/2013 | Imai | G06K 9/00798 348/148 |

FOREIGN PATENT DOCUMENTS

| JP | 3352216 | B2 | 12/2002 |
|---|---|---|---|
| JP | 5276637 | B2 | 8/2013 |
| JP | 2013-170815 | A | 9/2013 |
| KR | 10-0835803 | B1 | 6/2008 |

* cited by examiner

*Primary Examiner* — Shervin Nakhjavan
(74) *Attorney, Agent, or Firm* — Sughrue Mion, PLLC (57) ABSTRACT

Provided is a lane detection system and method. The lane detection method includes extracting feature points of a driving lane from an input road image, extracting candidate start points and candidate end points from candidate control points selected from among the feature points, selecting a left start point and a right start point of the driving lane from among the candidate start points based on information corresponding to a width of the driving lane, and selecting a left end point and a right end point of the driving lane from among the candidate end points based on a number of the candidate control points between each of the left start point and the candidate end points and the right start point and the candidate end points.

20 Claims, 11 Drawing Sheets

LANE DETECTION SYSTEM AND METHOD

CROSS-REFERENCE TO RELATED APPLICATION(S)

This application claims priority from Korean Patent Application No. 10-2013-0154107, filed on Dec. 11, 2013, in the Korean Intellectual Property Office, the disclosure of which is incorporated herein by reference in its entirety.

BACKGROUND

1. Field

Apparatus and methods consistent with exemplary embodiments relate to providing a lane detection system and method.

2. Description of the Related Art

With recent advances in information and communication technologies, Lane Departure Warning Systems (LDWS), safe driving assistance systems such as lane keeping, and vehicle auto-control systems have been developed and have been rapidly commercialized.

Lane recognition systems have been touted as a solution for preventing accidents caused by driver distraction. Furthermore, lane recognition systems are also needed to recognize environmental factors in an autonomous driving system.

However, in the lane recognition systems of the related art, a problem of false lane detection exists.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide a lane detection system and method, by which false detection of a lane may be minimized.

Additional aspects will be set forth in part in the description which follows and, in part, will be apparent from the description, or may be learned by practice of the exemplary embodiments.

According to an aspect of an exemplary embodiment, there is provided a lane detection method including extracting feature points of a driving lane from an input road image, extracting candidate start points and candidate end points from candidate control points selected from among the feature points, selecting a left start point and a right start point of the driving lane from among the candidate start points based on information corresponding to a width of the driving lane, and selecting a left end point and a right end point of the driving lane from among the candidate end points based on a number of the candidate control points between each of the left start point and the candidate end points and the right start point and the candidate end points.

The extracting the feature points may include extracting the feature points from a conversion image obtained by performing a bird's-eye conversion of the input road image.

The extracting the candidate start points and the candidate end points may include detecting a straight-line pattern between the feature points and generating a first line based on the detected straight-line pattern, setting a pair of the feature points which form respective end points of the first line as the candidate control points, selecting, as a candidate start point, a point on a second line extending from the first line along a same gradient as the first line, and selecting, as a candidate end point, an uppermost candidate control point from among candidate control points in a detection region set from a candidate control point paired with the candidate start point from among the candidate control points.

The selecting of the candidate start point may include selecting, as the candidate start point, a point at which a line located at a position indicating a start of a road intersects the second line.

The detection region may extend from the candidate control point paired with the candidate start point in a direction opposite to an extending direction of the second line, and includes a same gradient as that of the second line and a width corresponding to a sum of left and right distances from the candidate control point paired with the candidate start point. The left and right distances may be perpendicular to the gradient of the second line.

The selecting the left start point and the right start point may include classifying the candidate start points into a left group and a right group, selecting a candidate start point of the right group as the right start point, the candidate start point of the right group corresponding to a position at which a sum of probability distributions for existence of a right start point located within a distance corresponding to the width of the driving lane from a position of each candidate start point of the left group is largest, and selecting a candidate start point of the left group as the left start point, the candidate start point of the left group corresponding to a position at which a sum of probability distributions for existence of a left start point located within a distance corresponding to the width of the lane from a position of each candidate start point of the right group is largest.

The selecting the left end point and the right end point may include selecting a left candidate end point of a third line intersecting a largest number of the candidate control points as the left end point from among third lines connecting the left start point with the respective candidate end points, and selecting a right candidate end point of a third line intersecting a largest number of the candidate control points as the right end point from among third lines connecting the right start point with the respective candidate end points.

The selecting the left end point and the right end point may include selecting, as the left end point, a left candidate end point of a left third line having a largest number of the candidate control points existing within left and right distances from the left third line from among left third lines connecting the left start point with the respective candidate end points, and selecting, as the right end point, a right candidate end point of a right third line having a largest number of the candidate control points existing within left and right distances from the right third line from among right third lines connecting the right start point with the respective candidate end points. The left and right distances from the left third line may be perpendicular to a gradient of the left third line and the left and rights distances from the right third line may be perpendicular to a gradient of the right third line.

The selecting the left end point and the right end point may further include filtering non-connected candidate end points, from among the candidate end points, that are not to be connected with either of the left start point or the right start point by using a road map and filtering the candidate end points based on road pattern information extracted from the road map.

According to one or more embodiments of the present invention, a lane detection system includes a feature point extractor configured to extract feature points of a driving lane from an input road image, a control extractor configured to extract candidate start points and candidate end points from candidate control points selected from among the feature points, and a lane detector configured to select a left start point and a right start point of the driving lane from among the candidate start points based on information about a width of the driving lane, and select a left end point and a right end point of the driving lane from among the candidate end points based on a number of the candidate control points between each of the left start point and the candidate end points and the right start point and the candidate end points.

The lane detection system may further include an image converter configured to generate a conversion image obtained by performing a bird's-eye view conversion of the input road image, in which the feature point extractor may be further configured to extract the feature points from the conversion image.

The control extractor may include a line generator configured to detect a straight-line pattern between the feature points and generate a first line based on the detected straight-line pattern, a candidate control point setter configured to set a pair of the feature points which form respective end points of the first line as the candidate control points, a candidate start point selector configured to select, as a candidate start point, a point on a second line extending from the first line along a same gradient as the first line, and a candidate end point selector configured to select, as a candidate end point, an uppermost candidate control point from among candidate control points in a detection region set from a candidate control point paired with the candidate start point from among the candidate control points.

The candidate start point selector may be further configured to select, as the candidate start point, a point at which a line located at a position indicating a start of a road intersects the second line.

The detection region may extend from the candidate control point paired with the candidate start point in a direction opposite to an extending direction of the second line, and includes a same gradient as that of the second line and a width corresponding to a sum of left and right distances from the candidate control point paired with the candidate start point. The left and right distances may be perpendicular to the gradient of the second line.

The lane detector may include a classifier configured to classify the candidate start points into a left group and a right group and a start point selector configured to select a candidate start point of the right group as the right start point, the candidate start point of the right group corresponding to a position at which a sum of probability distributions for existence of a right start point located within a distance corresponding to the width of the driving lane from a position of each candidate start point of the left group is largest, and select a candidate start point of the left group as the left start point, the candidate start point of the left group corresponding to a position at which a sum of probability distributions for existence of a left start point located within a distance corresponding to the width of the driving lane from a position of each candidate start point of the right group is largest.

The lane detector may include an end point selector configured to select, as the left end point, a left candidate end point of a third line intersecting a largest number of the candidate control points from among third lines connecting the left start point with the respective candidate end points, and select, as the right end point, a right candidate end point of a third line intersecting a largest number of the candidate control points from among third lines connecting the right start point with the respective candidate end points.

The lane detector may include an end point selector configured to select, as the left end point, a left candidate end point of a left third line having a largest number of the candidate control points existing within left and right distances from the left third line from among third lines connecting the left start point with the respective candidate end points, and select, as the right end point, a right candidate end point of a right third line having a largest number of the candidate control points existing within left and right distances from the right third line from among third lines connecting the right start point with the respective candidate end points. The left and right distances from the left third line may be perpendicular to a gradient of the left third line, and the left and right distances from the right third line may be perpendicular to a gradient of the right third line.

The end point selector may be further configured to filter non-connected candidate end points, from among the candidate end points, that are not to be connected with either of the left start point or the right start point by using a road map and may filter the candidate end points based on road pattern information extracted from the road map.

BRIEF DESCRIPTION OF THE DRAWINGS

The above and/or other aspects will become more apparent and more readily appreciated by describing certain exemplary embodiments, taken in conjunction with the accompanying drawings, in which.

DETAILED DESCRIPTION OF EXEMPLARY EMBODIMENTS

Certain exemplary embodiments will now be described in greater detail with reference to the accompanying drawings.

In the following description, the same reference numerals are used for the same elements, even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Although ordinal numbers such as "first", "second", and so forth will be used to describe various components, those components are not limited by the terms, or the order of such terms. The terms are used only for distinguishing one component from another component.

The terminology used herein is for the purpose of describing exemplary embodiments only and is not intended to be limiting of exemplary embodiments. As used herein, the singular forms are intended to include the plural forms as well, unless the context clearly indicates otherwise. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

Exemplary embodiments may be described in terms of functional block components and various processing steps. Such functional blocks may be realized by any number of hardware and/or software components configured to perform the specified functions. For example, exemplary embodiments may employ various integrated circuit components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the disclosure may be implemented with any programming or scripting language such as C, C++, Java, assembler, or the like, with the various algorithms being implemented with any combination of data structures, objects, processes, routines or other programming elements. Functional aspects may be implemented with an algorithm executed in one or more processors. Furthermore, the exemplary embodiments could employ conventional techniques for electronics configuration, signal processing and/or control, data processing, and the like. Terms such as "mechanism", "element", "means", "component", etc., may be used in a broad sense, and are not limited to mechanical and physical components. The terms may include a meaning of a series of routines of software in connection with a processor or the like.

Figure 1:
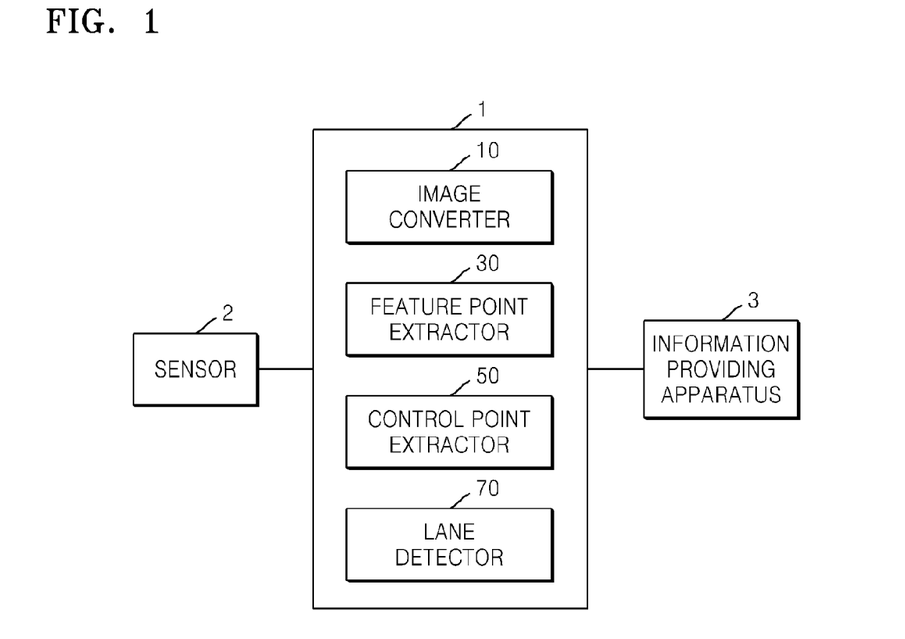
FIG. 1 is a schematic block diagram illustrating a lane detection system according to an exemplary embodiment.

FIG. 1 is a schematic block diagram illustrating a lane detection system according to an exemplary embodiment.

Referring to FIG. 1, a lane detection system 1 may include an image converter 10, a feature point extractor 30, a control point extractor 50, and a lane detector 70.

The lane detection system 1 recognizes left and right lane markings of a current driving road to detect left and right boundaries and thus detect a lane.

The image converter 10 receives a road image including road information from a sensor 2 connected to the lane detection system 1. The road information may include lane markings drawn on the road surface.

The sensor 2 is an image recognition apparatus attached to a driving vehicle and may be, for example, a camera obtaining an image of the area surrounding the vehicle. The sensor 2 may be installed in the front, rear, or lateral sides of the vehicle, and may be selectively mounted in a proper position to optimally obtain a road image. The range of the image of the area surrounding the vehicle obtained by the sensor 2 may vary according to a type of the sensor 2 mounted on the vehicle, such that the entire width of the road or the width of a current driving lane may be shown on the image. Exemplary embodiments are not limited to this example, and various sensors such as an infrared sensor, a radar or a lidar sensor, as well as an image recognition apparatus may be used alone or in combination.

The image converter 10 performs a bird's-eye view conversion on the input road image. The bird's-eye view conversion refers to a conversion that assumes that information included in the input road image is on a same plane and a floor plan of the road, which expresses the road image, is generated based on the assumption. That is to say, a two-dimensional image of the road image is generated as if being viewed from above. The bird's-eye view conversion may be performed by well-known techniques and thus will not be described in detail.

Figure 2:
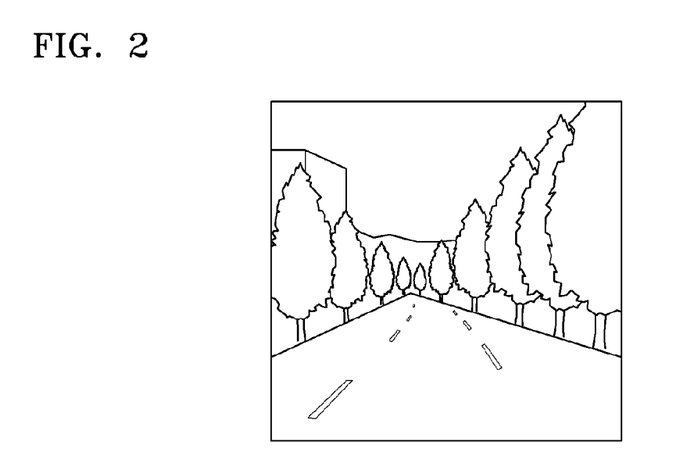
FIG. 2 is a diagram illustrating a road image input from a sensor prior to a bird's-eye view conversion.
Figure 3:
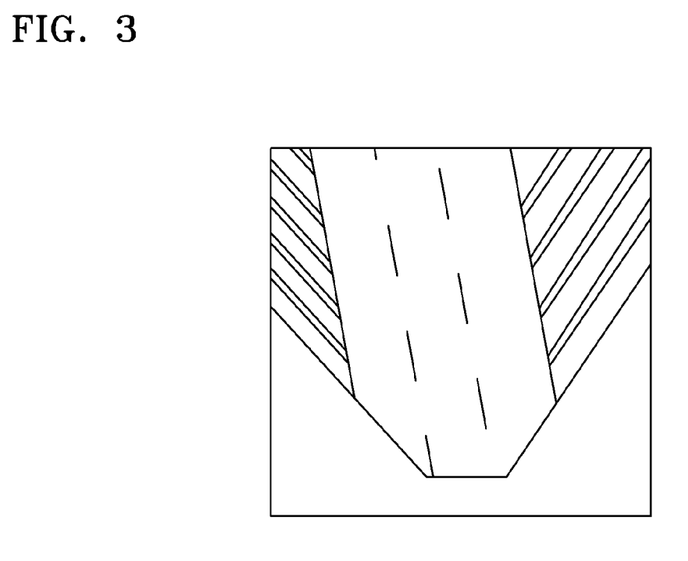
FIG. 3 is a diagram illustrating a conversion image obtained by performing a bird's-eye view conversion on a road image illustrated in FIG. 2.

FIG. 2 is a diagram illustrating a road image input from a sensor prior to a bird's-eye view conversion, and FIG. 3 is a diagram illustrating a conversion image obtained by performing the bird's-eye view conversion on the road image illustrated in FIG. 2. The image converter 10 converts the road image illustrated in FIG. 2 into a conversion image illustrated in FIG. 3, which represents a view in which the road is seen perpendicularly from above the road.

The image converter 10 extracts data in a Region of Interest (ROI) for conversion to increase processing speed. A width of the ROI is set to include left and right lane markings of a current driving lane and a height of the ROI is set to a height for setting a gradient of the lane after the bird's-eye view conversion.

Figure 4:
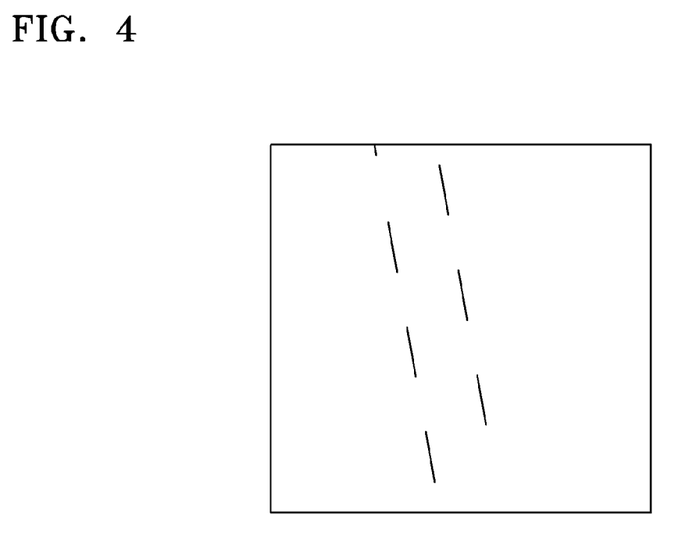
FIG. 4 is a diagram illustrating a Feature Point (FP) extraction result according to an exemplary embodiment.

The feature point extractor 30 detects feature points of the lane in a conversion image. The feature point extractor 30 learns a lane model through lane samples in various environments and situations such as weather, lighting, the degree of lane damage, and so forth. The feature point extractor 30 detects lane feature points having features of the lane from lane markings of an input conversion image. The feature point extractor 30 detects the feature points of the lane on which the vehicle is driving. The feature point extractor 30 may detect the lane feature points by using an Artificial Neural Network (ANN) architecture. However, exemplary embodiments are not limited thereto, and various feature point extraction algorithms may be used. FIG. 4 is a diagram illustrating an image illustrating a feature point extraction result according to an exemplary embodiment.

The control point extractor 50 selects candidate control points from among the lane feature points and extracts candidate start points and candidate end points from the candidate control points.

The lane detector 70 selects a left start point and a right start point of the driving lane from among the candidate start points based on lane width information, and selects a left end point and a right end point of the driving lane from among the candidate end points based on the selected left and right start points. The lane detector 70 determines a left boundary connecting the left start point with the left end point and a right boundary connecting the right start point with the right end point, thus detecting the lane.

The lane detection system 1 provides information of the detected lane to a driver through an information providing apparatus 3. The information providing apparatus 3 is a display apparatus that provides an image obtained from the sensor 2 and a driving lane detection result from the lane detection system 1, and may be connected with the lane detection system 1 in a wired or wireless manner. The information providing apparatus 3 may provide information to the driver in various ways such as though an image, text, or a voice, and may provide a display method (for example, indication of a lane and a non-lane in different colors) which is customized by a user so that when providing an image, the user's recognition can be improved. The range of the road provided by the information providing apparatus 3 may vary according to the range of the image obtained from the sensor 2 and may provide the entire obtained image or an image of the road corresponding to a direction in which the vehicle is traveling. Approximate distance information to a position of the sensor 2 or to a center position of the vehicle from the edges (left, right) of the lane may be obtained from the driving lane detection result.

Figure 5:
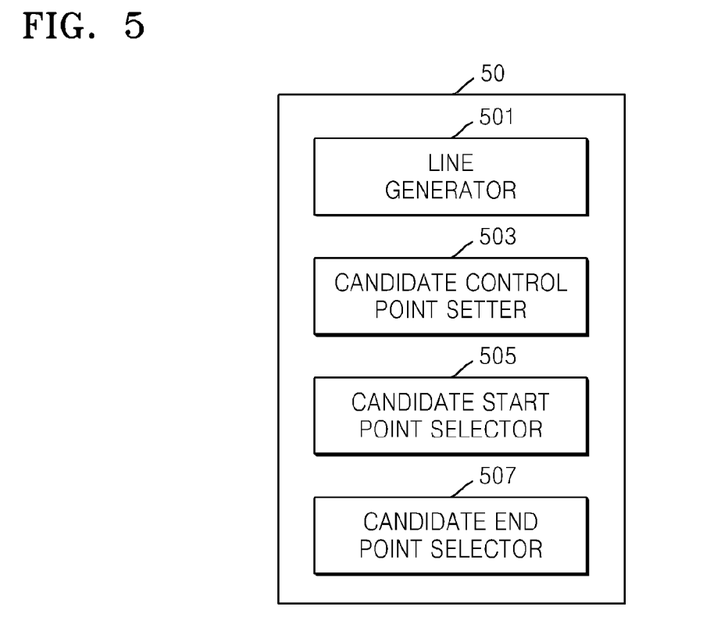
FIG. 5 is a schematic block diagram illustrating a structure of a control point extractor according to an exemplary embodiment.

FIG. 5 is a schematic block diagram illustrating a structure of the control point extractor 50 according to an exemplary embodiment, and FIGS. 6A to 6F are exemplary diagrams illustrating a control point extraction process performed by the control point extractor 50.

Referring to FIG. 5, the control point extractor 50 may include a line generator 501, a candidate control point setter 503, a candidate start point selector 505, and a candidate end point selector 507.

The line generator 501 detects a straight-line pattern between feature points and generates a first line based on the detected straight-line pattern. The line generator 501 may detect a straight-line pattern representing a relationship between two or more feature points in a predetermined region and generate the first line based on the detected straight-line pattern. The line generator 501 generates the first line according to the straight-line pattern detected from the two or more feature points. The line generator 501 may detect the straight-line pattern between the feature points by using, for example, a Hough transform algorithm. The line generator 501 removes feature points that do not form the first line.

The candidate control point setter 503 selects a pair of feature points forming both end points of the first line as candidate control points. A lane boundary is formed of a continuous line between a start point and an end point, and thus to draw the lane, the start point and the end point of the lane boundary are needed. The candidate control point setter 503 obtains the candidate control points which form a set of candidate start points and candidate end points.

Figure 6A:
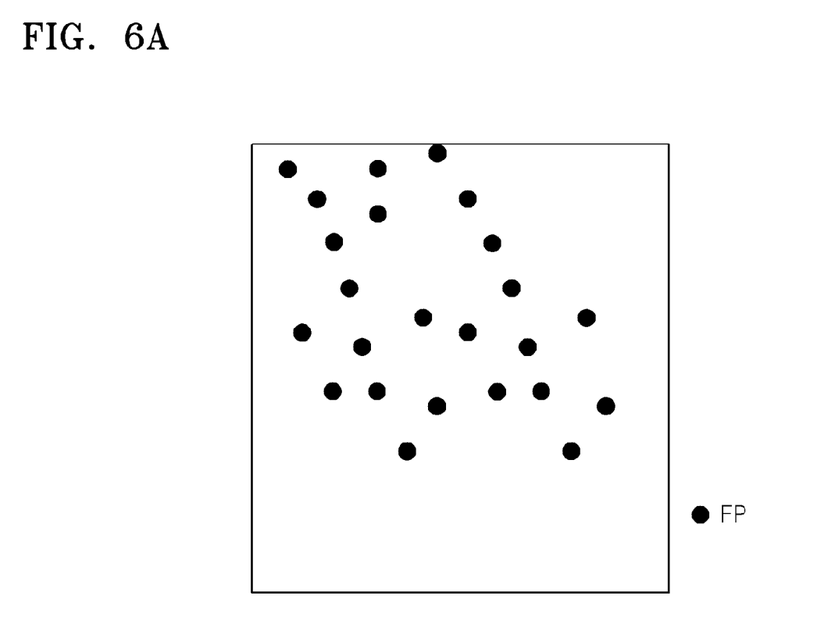
FIGS. 6A to 6F are exemplary diagrams illustrating a control point extraction process performed by a control point extractor.
Figure 6B:
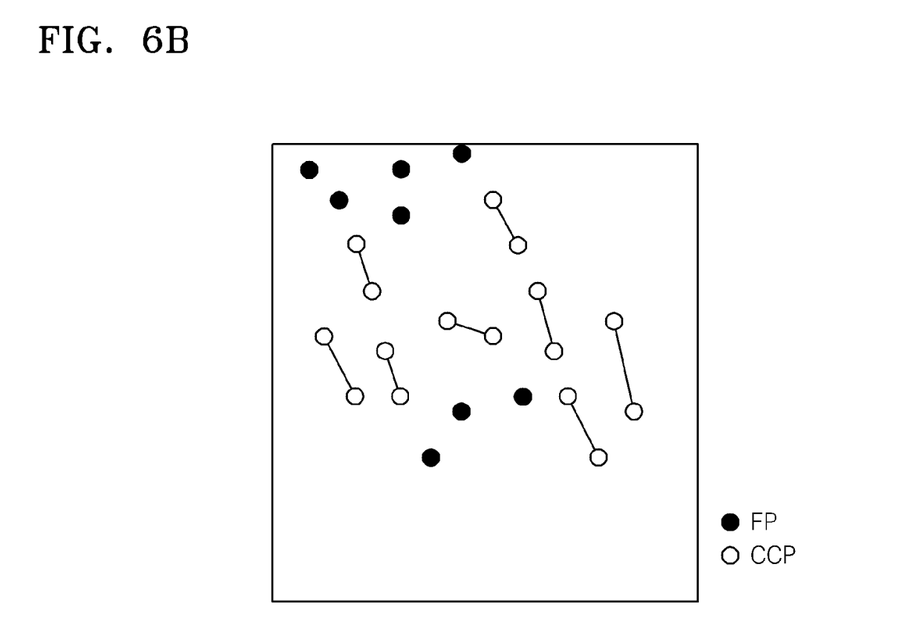

FIG. 6A is a diagram illustrating feature points FP, and FIG. 6B is a diagram illustrating a result of obtaining candidate control points CCP as the line is generated. The line generator 501 generates a plurality of first lines, as illustrated in FIG. 6b, according to the straight-line pattern detected from the feature points FP illustrated in FIG. 6A, and the candidate control point setter 503 sets a pair of feature points FP forming both end points of the first line as the candidate control points CCP.

The candidate start point selector 505 may estimate and select a candidate start point CSP from the candidate control points CCP by using extrapolation. The candidate start point selector 505 may extract a point meeting a second line FL, which extends downwardly from the first line generated by the line generator 501, as a candidate start point CSP. The second line FL extends at the gradient of the first line downward from a lower end point between the both end points of the first line to a lowermost line LP of the road. The lowermost line LP of the road may be a horizontal line indicating a start position of the road in the conversion image.

Figure 6C:
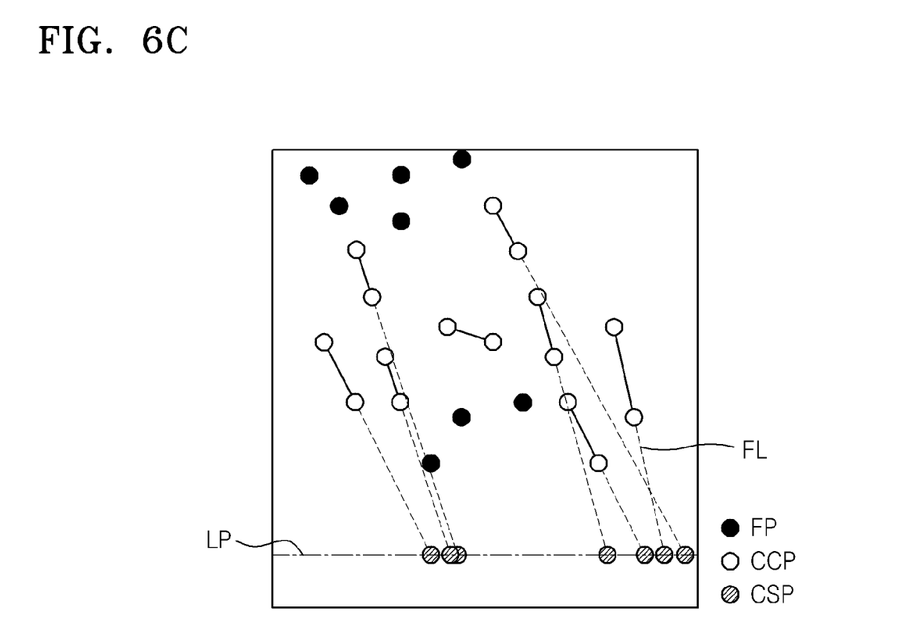

FIG. 6C is a diagram illustrating extraction of the candidate start points CSP, in which points at which the second line FL extending from the first line meets the lowermost line LP of the road are extracted as the candidate start points CSP.

The candidate end point selector 507 traces back candidate control points reversely to the extending direction of the second line, thus selecting candidate end points CEP. The candidate end point selector 507 approximates a curved lane to a straight-line lane, thus selecting candidate end points of the straight-line lane or the curved lane based on tracing-back.

More specifically, the candidate end point selector 507 selects a candidate control point paired with a candidate start point. The candidate control point may be a candidate control point at which the second line including the candidate start point starts, that is, a lower end point of the first line. The candidate end point selector 507 may generate a detection region having a width corresponding to a sum of left and right distances from the candidate control point and the gradient of the first line or the second line. The left and right distances may extend is a direction which is perpendicular to the gradient of the first line or the second line. The candidate end point selector 507 may select an uppermost candidate control point as a candidate end point from among candidate control points existing in the detection region.

Figure 6D:
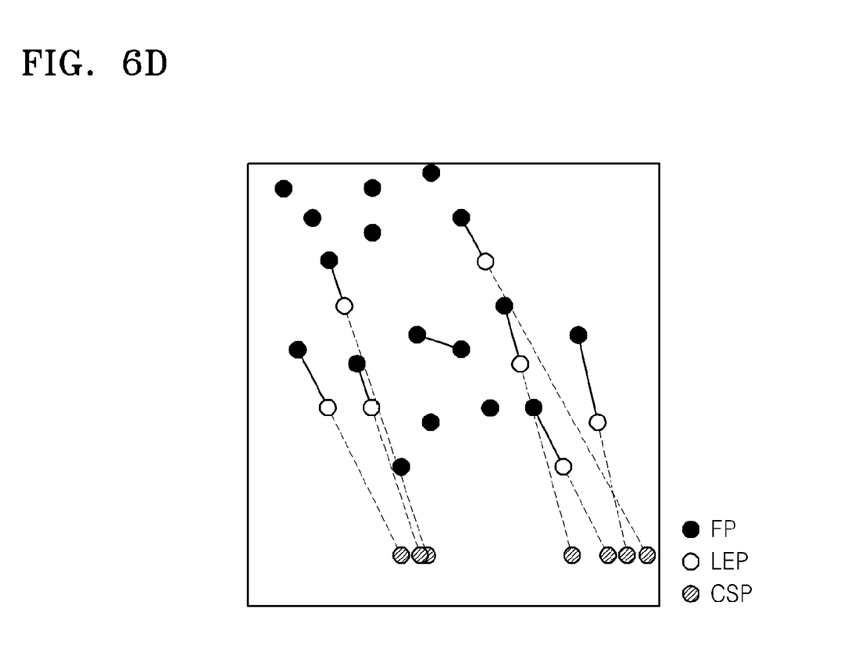
Figure 6E:
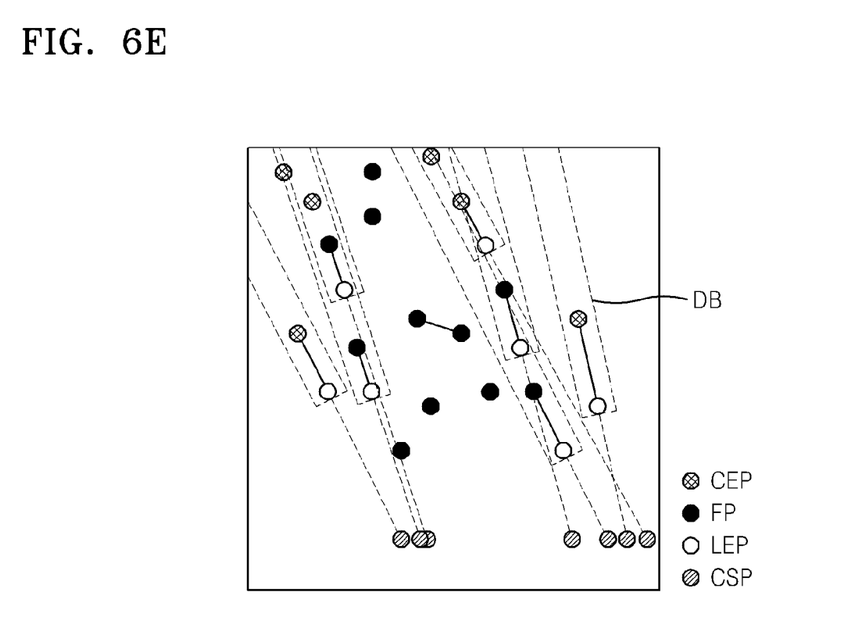
Figure 6F:
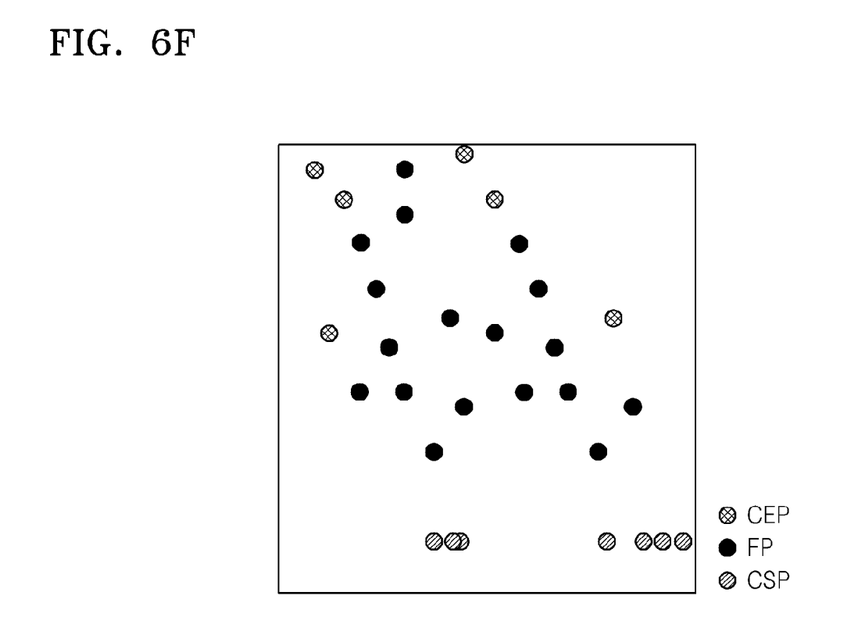

FIGS. 6D to 6F are diagrams illustrating selection of candidate end points CEP.

As illustrated in FIG. 6D, when the second line extends from a candidate start point CSP reversely, a lower end point of the first line meeting the second line is selected as a candidate control point LEP paired with the candidate start point CSP. As illustrated in FIG. 6E, a detection region DB is generated which has a width corresponding to a sum of left and right distances from the selected candidate control point LEP (for example, a width corresponding to a distance of three left pixels to the left and three right pixels to the right from the candidate control point LEP) and the gradient of the second line. As illustrated in FIG. 6F, from among the candidate control points LEP existing in the detection region DB, uppermost candidate control points are selected as candidate end points CEP.

Figure 7:
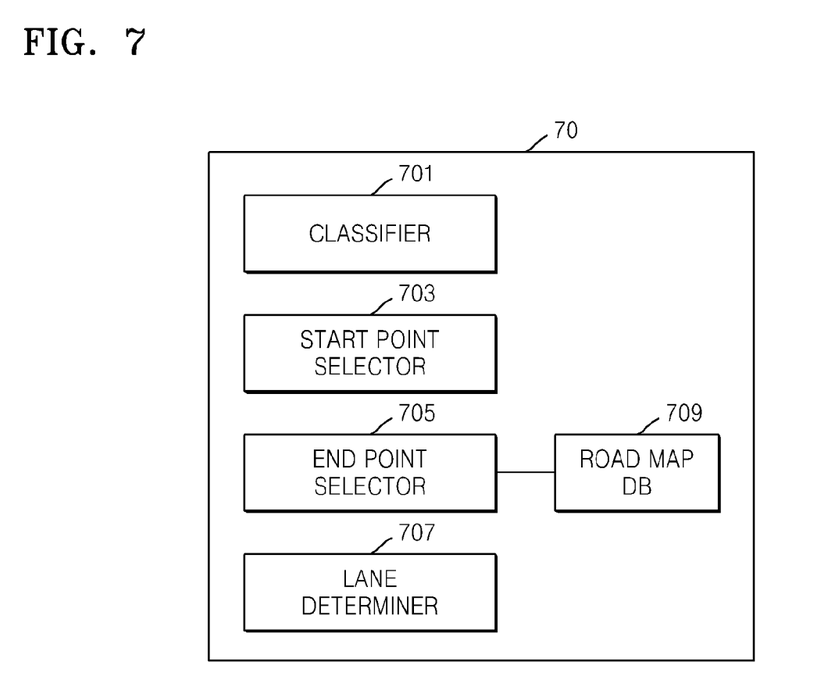
FIG. 7 is a schematic block diagram illustrating a structure of a lane detector according to an exemplary embodiment.

FIG. 7 is a schematic block diagram illustrating a structure of the lane detector 70 according to an exemplary embodiment. FIGS. 8A to 8D are exemplary diagrams illustrating a lane detection process performed by the lane detector 70.

Referring to FIG. 7, the lane detector 70 may include a classifier 701, a start point selector 703, an end point selector 705, a lane determiner 707, and a road map database (DB) 709.

The classifier 701 classifies candidate start points into two groups, a left group and a right group, to correspond to a left boundary and a right boundary of the lane, respectively. The classifier 701 may classify the candidate start points into the left group and the right group based on an average distance between the candidate start points. The classifier 701 may classify the candidate start points into the left group and the right group by using, for example, a K-mean algorithm.

Figure 8A:
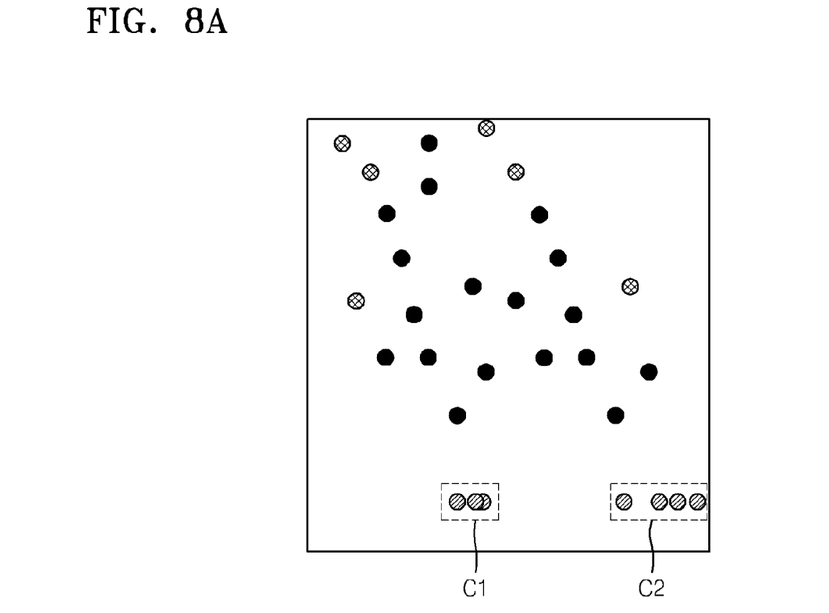
FIGS. 8A to 8D are exemplary diagrams illustrating a lane detection process performed by a lane detector.

FIG. 8A illustrates a left group C1 and a right group C2 of candidate start points classified according to an exemplary embodiment.

The start point selector 703 selects a left start point from among candidate start points of the left group C1 and a right start point from among candidate start points of the right group C2 based on a lane width (for example, 3.6 m) prescribed in the local road traffic laws. The start point selector 703 may select a right start point from among the candidate start points of the right group C2 which is located within a distance corresponding to the lane width from each candidate start point of the left group C1. The start point selector 703 may select a left start point from among the candidate start points of the left group C1 which is located within a distance corresponding to the lane width from each candidate start point of the right group C2.

More specifically, the start point selector 703 calculates a Gaussian probability distribution P[C1] having a distance corresponding to a lane width from each candidate start point $p_1, p_2, p_3, \ldots, p_n$ of the left group C1 as an average value $\mu_1$ and a given value as a dispersion value $\theta$. The start point selector 703 may select a candidate start point of the right group C2 corresponding to a position at which a sum of probability distributions P[C1] is largest as a right start point $SCP_{right}$.

The start point selector 703 calculates a Gaussian probability distribution P[C2] having a distance corresponding to a lane width from each candidate start point $p_1, p_2, p_3, \ldots, p_m$ of the right group C2 as an average value $\mu_2$ and a given value as a dispersion value $\theta$. The start point selector 703 may select a candidate start point of the left group C1 corresponding to a position at which a sum of probability distributions P[C2] is largest as a left start point $SCP_{left}$.

In the following equations, p denotes position coordinates (x, y) of each candidate start point, and $\mu$ and $\theta$ are represented by the number of pixels corresponding to a real distance calculated from a conversion image.

$$C1=\{p_1, p_2, p_3, \ldots, p_n\}$$

$$C2=\{p_1, p_2, p_3, \ldots, p_m\}$$

$P[C1(p_i)]$=Gaussian($\mu_1$, $\theta$), [$\mu_1$=a position of an x axis of each candidate start point of C1+the number of pixels corresponding to a lane width (for example, 3.6 m), $\theta$=the number of pixels corresponding to a predetermined distance (for example, 1 m)]

$P[C2(p_j)]$=Gaussian($\mu_2$, $\theta$), [$\mu_2$=a position of an x axis of each candidate start point of C2−the number of pixels corresponding to a lane width (for example, 3.6 m), $\theta$=the number of pixels corresponding to a predetermined distance (for example, 1 m)]

$$SCP_{left}=MAX(\Sigma P[C2(p_j)])$$

$$SCP_{right}=MAX(\Sigma P[C1(p_i)])$$

Figure 8B:
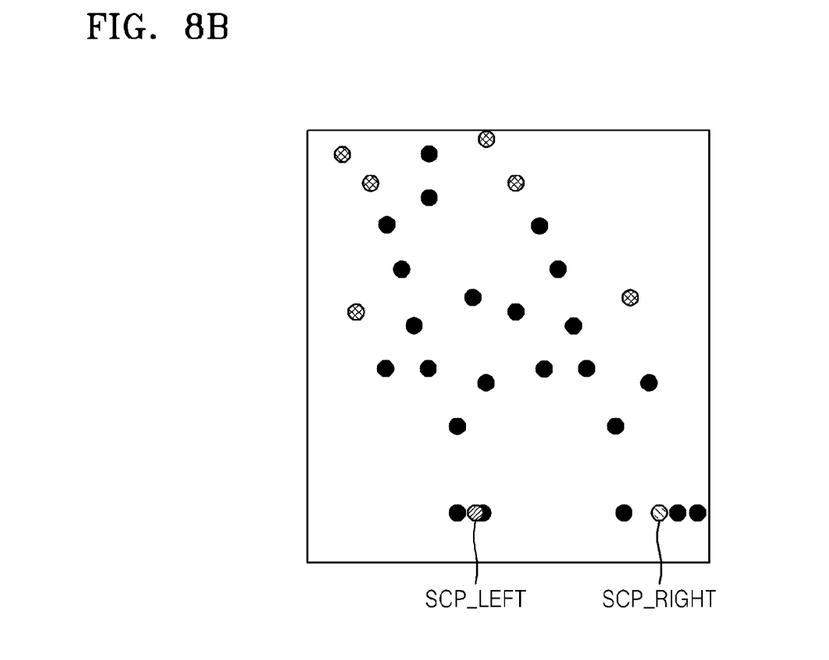

FIG. 8B illustrates an example of extraction of the left start point $SCP_{left}$ and the right start point $SCP_{right}$ according to an exemplary embodiment.

The end point selector 705 selects a third line representing a left boundary from among third lines connecting a left start point and respective candidate end points and selects a candidate end point of the selected third line as a left end point. The end point selector 705 selects a third line representing a right boundary from among third lines connecting a right start point and respective candidate end points and selects a candidate end point of the selected third line as a right end point. The end point selector 705 may extract a left end point and a right end point by using, for example, a Random Sample Consensus (RANSAC) algorithm.

For example, the end point selector 705 may select a candidate end point of a third line intersecting the largest number of candidate control points as a left end point from among the third lines connecting the left start point and the respective candidate end points. The end point selector 705 may also select a candidate end point of a third line intersecting the largest number of candidate control points as a right end point from among the third lines connecting the right start point and the respective candidate end points.

In another example, the end point selector 705 may select a candidate end point of a third line having the largest number of candidate control points existing within left and right distances from the third line as a left end point from among the third lines connecting the left start point and the respective candidate end points. The end point selector 705 may select a candidate end point of a third line having the largest number of candidate control points existing within left and right distances from the third line as a right end point from among the third lines connecting the right start point and the respective candidate end points.

Before generating the third line, the end point selector 705 may extract road pattern information from a road map of the current driving road in the road map DB 709 and filter candidate end points based on the extracted road pattern information. The road pattern information may include rough shape information of the current driving road, such as the degree of bending (i.e., curvature) of the current driving road.

More specifically, the end point selector 705 may exclude candidate end points to be connected with the left start point and candidate end points to be connected with the right start point through filtering based on the road pattern information of the current driving road. In this case, the number of third lines to be generated may be reduced, thereby reducing the time and amount of computation for end point extraction and an end-point false detection rate. For example, if the current driving road is bent to the right, left candidate end points may be excluded from third line generation for right end point extraction and right candidate end points may be excluded from third line generation for left end point extraction.

Figure 8C:
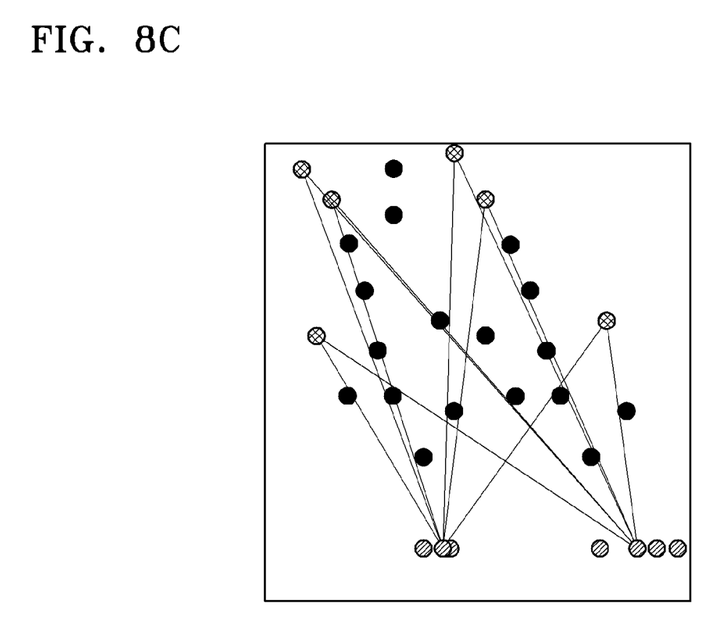

FIG. 8C illustrates an example of third lines connecting a left start point with respective candidate end points and third lines connecting a right start point with the respective candidate end points according to an exemplary embodiment.

Figure 8D:
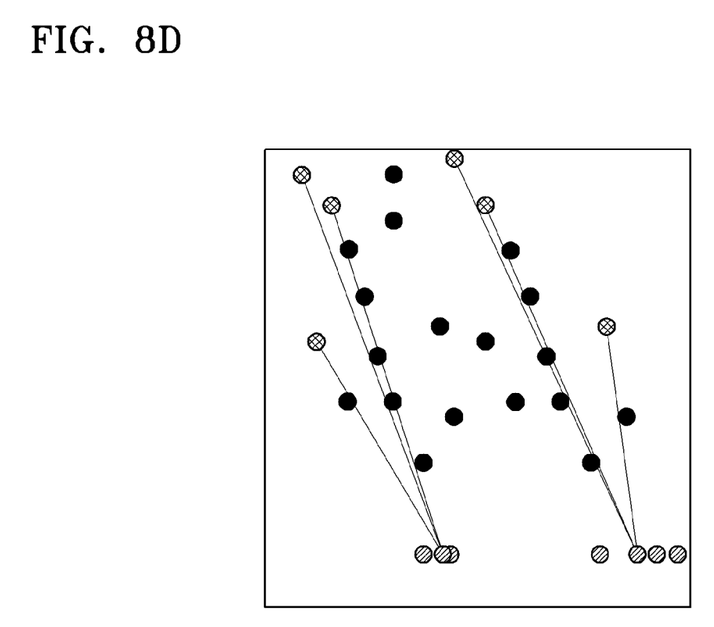

FIG. 8D illustrates third lines generated after filtering of the candidate end points based on road map information according to an exemplary embodiment. Referring to FIG. 8D, if it is recognized based on the road map information extracted from the road map DB 709 that the current driving road is bent to the left, the end point selector 705 excludes right candidate end points through filtering, generates third lines connecting respective non-excluded left candidate end points with a left start point, excludes left candidate end points through filtering, and generates third lines connecting respective non-excluded right candidate end points with a right start point. It can be seen that the number of third lines in the embodiment illustrated in FIG. 8D is reduced when compared to that in the embodiment illustrated in FIG. 8C.

The lane determiner 707 connects a left start point and a right start point that are selected by the start point selector 703 with a left end point and a right end point that are selected by the end point selector 705 to generate a left boundary and a right boundary and thus determine the current driving lane.

The road map DB 709 stores road maps of available driving roads. From the road maps, pattern information about a road shape such as the degree of bending of a road may be extracted. The road map may include information such as an index of each lane, a series of waypoints of each lane, an adjacent lane boundary, a lane edge boundary, a vehicle traveling direction, directions in which the vehicle may travel at an intersection, a stop line, and so forth. The lane detection system 1 may skip lane detection if it is recognized from the road map that the degree of bending of the road is greater than a reference value (for example, in the case of an intersection).

Figure 9:
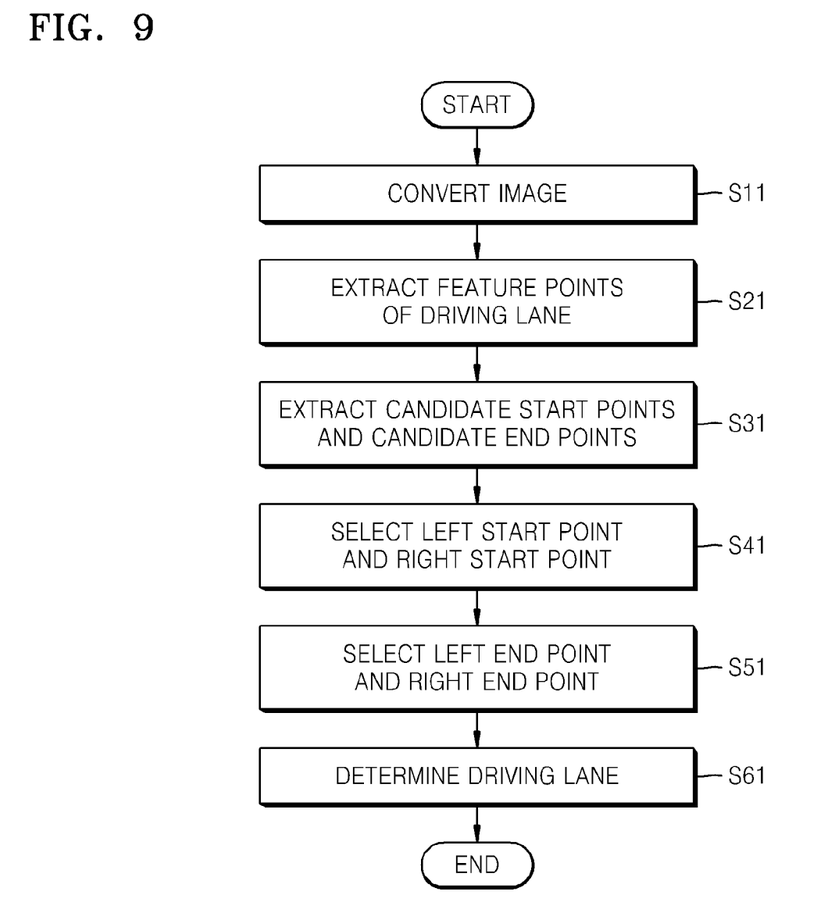
FIGS. 9 to 12 are diagrams and flowcharts illustrating a lane detection method according to an exemplary embodiment.
Figure 10:
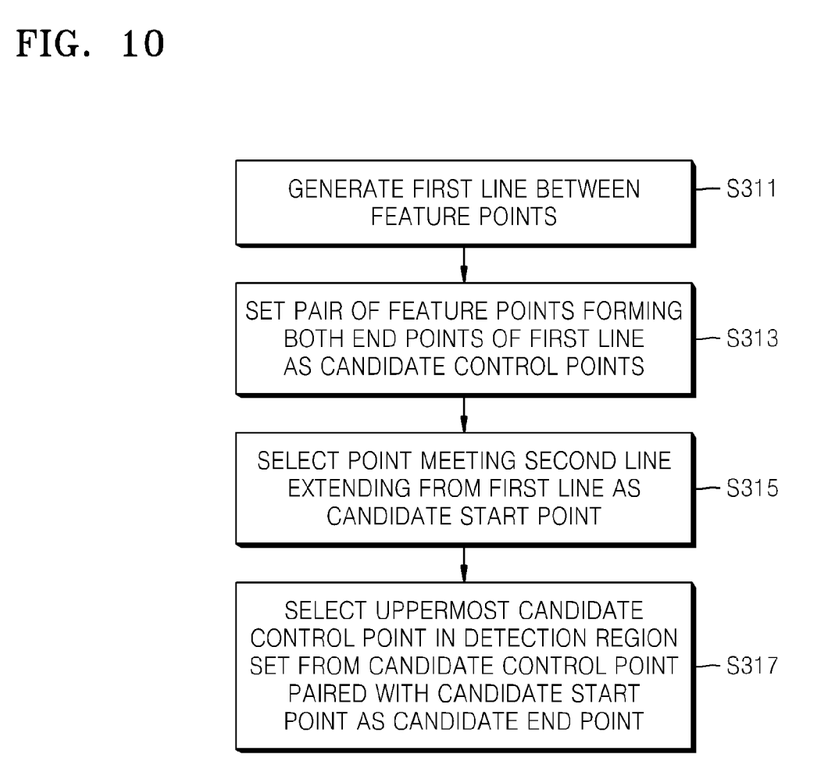
Figure 11:
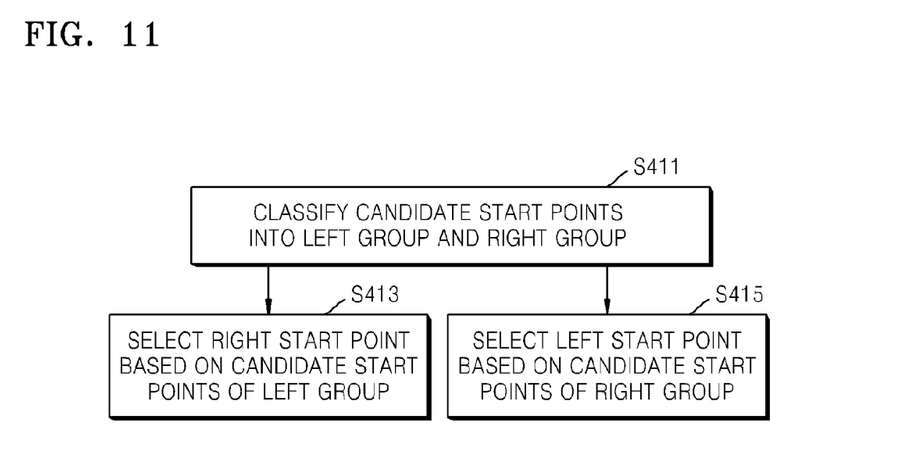
Figure 12:
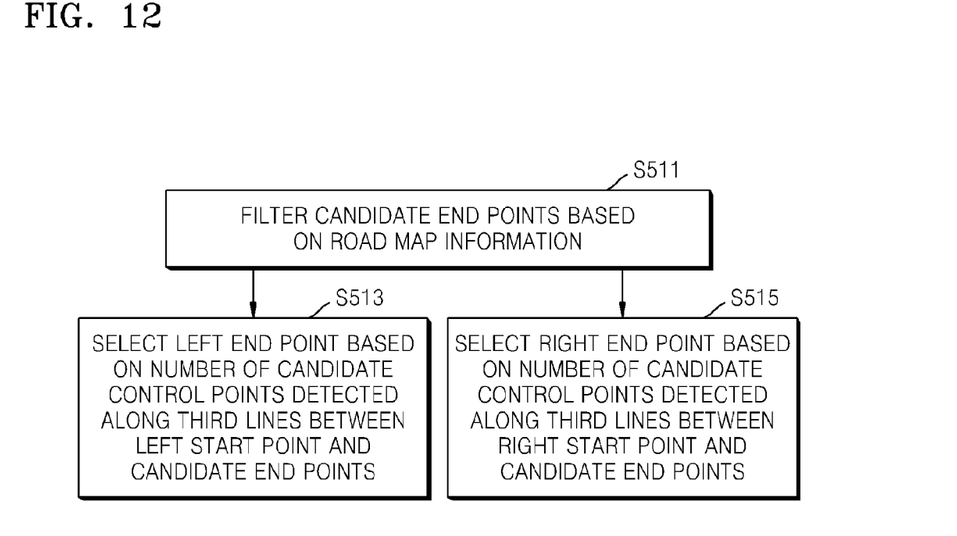

FIG. 9 is a flowchart illustrating a lane detection method according to an exemplary embodiment. FIG. 10 is a flowchart illustrating extraction of candidate start points and candidate end points according to an exemplary embodiment. FIG. 11 is a flowchart illustrating selection of a left start point and a right start point according to an exemplary embodiment. FIG. 12 is a flowchart illustrating selection of the left end point and the right end point illustrated in FIG. 9 according to an exemplary embodiment.

Referring to FIG. 9, the lane detection system 1 generates a conversion image by performing a bird's-eye view conversion on an input road image in operation S11.

The lane detection system 1 extracts feature points of a driving lane from the conversion image in operation S21. The feature points of the lane may be extracted using, for example, an ANN architecture.

The lane detection system 1 selects candidate control points from among the extracted feature points and extracts candidate start points and candidate end points from the selected candidate control points in operation S31.

Also, referring to FIG. 10, the lane detection system 1 detects a straight-line pattern between feature points and generates a first line based on the detected straight-line pattern in operation S311. The straight-line pattern may be detected using, for example, a Hough transform algorithm.

The lane detection system 1 sets a pair of feature points forming both end points of the first line as candidate control points in operation S313.

The lane detection system 1 selects a point at which a second line extending downward from the first line meets a line indicating a start position of a road as a candidate start point in operation S315. The second line may have the same gradient as the first line.

The lane detection system 1 selects an uppermost candidate control point as a candidate end point from among candidate control points of a detection region that is set from a candidate control point paired with the candidate start point, in operation S317. The lane detection system 1 stores a candidate control point located reversely to the second line extending to find a corresponding candidate start point pairwise with the candidate start point. The detection region extends reversely to the extending direction of the second line from the candidate control point paired with the candidate start point, and has the gradient of the second line and a width corresponding to left and right distances from the candidate control point paired with the candidate start point.

The lane detection system 1 selects a left start point and a right start point of the driving lane from the candidate start points based on the lane width information in operation S41.

Also, referring to FIG. 11, the lane detection system 1 classifies the candidate start points into a left group and a right group in operation S411. For example, the lane detection system 1 may classify the candidate start points into the left group and the right group by using a K-mean algorithm.

The lane detection system selects a candidate start point of the right group as a right start point, in which the candidate start point of the right group corresponds to a position in which a sum of probability distributions for existence of a right start point located within a distance corresponding to the lane width from a position of each candidate start point of the left group is largest, in operation S413.

The lane detection system 1 selects a candidate start point of the left group as a left start point, in which the candidate start point of the left group corresponds to a position in which a sum of probability distributions for existence of a left start point located within a distance corresponding to the lane width from a position of each candidate start point of the right group is largest, in operation S415.

The lane detection system 1 selects a left end point and a right end point of the driving lane based on the number of candidate control points between the left and right start points and the respective candidate end points in operation S51.

Also, referring to FIG. 12, the lane detection system 1 selects a candidate end point of a third line as a left end point, in which the third line has the largest number of candidate control points detected along the third lines connecting the left start point with the respective candidate end points, in operation S513. The lane detection system 1 may use an RANSAC algorithm for end point selection.

The lane detection system 1 selects a candidate end point of a third line as a right end point, in which the third line has the largest number of candidate control points detected along the third lines connecting the right start point with the respective candidate end points, in operation S515.

Herein, the number of candidate control points detected may be the number of candidate control points through which the third line passes (or which overlap the third line) or the number of candidate control points existing within left and right distances from the third line.

Before generating the third line, the lane detection system 1 excludes candidate end points that are not to be connected with the left start point and candidate end points that are not to be connected with the right start point through filtering based on road pattern information extracted from a road map in operation S511. Thus, the number of candidate end points to be connected with the left start point through the third lines and the number of candidate end points to be connected with the right start point through the third lines may be reduced, thus reducing the time and amount of computation for end point selection. The road pattern information may include, for example, rough shape information of the road such as the degree of bending of the road.

The land detection system detects a left boundary connecting the left start point with the left end point and a right boundary connecting the right start point with the right end point, thus detecting the lane, in operation S61.

A result image of the lane detection system 1 is displayed to allow the driver to recognize the driving lane on the driving road, such that the driver may be assisted in driving such as lane departure determination, lane change, and so forth.

Moreover, if noise is generated in a value of a sensor used for sensing a current location of the vehicle during autonomous driving, the lane may be recognized according to an exemplary embodiment for correction of the noise and location information of the vehicle may be corrected.

An exemplary embodiment may be applied to an indoor autonomous mobile robot for line tracing.

The lane detection method according to the exemplary embodiments may be embodied as a processor-readable code on a recording medium that may be read by a processor included in the image display apparatus or the server. The processor-readable recording medium includes all kinds of recording devices capable of storing data that is readable by a processor. Examples of the processor-readable recording medium include read-only memory (ROM), random access memory (RAM), CD-ROMs, magnetic tapes, floppy disks, optical data storage devices, and carrier waves such as transmission over the Internet. The processor-readable recording medium can also be distributed over a network of coupled computer systems so that the processor-readable code may be stored and executed in a decentralized fashion. Also, functional programs, code, and code segments for implementing the exemplary embodiments can be easily construed by programmers of ordinary skill in the art.

As described above, according to the one or more of the above exemplary embodiments, by detecting a start point and an end point of a lane, rapid and accurate lane detection is possible.

While one or more exemplary embodiments have been described with reference to the figures, it will be understood by those of ordinary skill in the art that various changes in form and details may be made therein without departing from the spirit and scope of the inventive concept as defined by the appended claims.

What is claimed is:

1. A lane detection method comprising:
   extracting feature points of a driving lane from an input road image;
   extracting candidate start points and candidate end points from candidate control points selected from among the feature points;
   selecting a left start point and a right start point of the driving lane from among the candidate start points based on information corresponding to a width of the driving lane; and
   selecting a left end point and a right end point of the driving lane from among the candidate end points based on a number of the candidate control points between each of the left start point and the candidate end points and the right start point and the candidate end points.

2. The lane detection method of claim 1, wherein the extracting the feature points comprises extracting the feature points from a conversion image obtained by performing a bird's-eye view conversion of the input road image.

3. The lane detection method of claim 1, wherein the extracting the candidate start points and the candidate end points comprises:
   detecting a straight-line pattern between the feature points and generating a first line based on the detected straight-line pattern;
   setting a pair of the feature points which form respective end points of the first line as the candidate control points;
   selecting, as a candidate start point, a point on a second line extending from the first line along a same gradient as the first line; and
   selecting, as a candidate end point, an uppermost candidate control point from among candidate control points in a detection region set from a candidate control point paired with the candidate start point from among the candidate control points.

4. The lane detection method of claim 3, wherein the selecting of the candidate start point comprises selecting, as the candidate start point, a point at which a line located at a position indicating a start of a road intersects the second line.

5. The lane detection method of claim 3, wherein the detection region extends from the candidate control point paired with the candidate start point in a direction opposite to an extending direction of the second line, and comprises a same gradient as that of the second line and a width corresponding to a sum of left and right distances from the candidate control point paired with the candidate start point, and
   wherein the left and right distances are perpendicular to the gradient of the second line.

6. The lane detection method of claim 1, wherein the selecting the left start point and the right start point comprises:
   classifying the candidate start points into a left group and a right group;
   selecting a candidate start point of the right group as the right start point, the candidate start point of the right group corresponding to a position at which a sum of probability distributions for existence of a right start point located within a distance corresponding to the width of the driving lane from a position of each candidate start point of the left group is largest; and
   selecting a candidate start point of the left group as the left start point, the candidate start point of the left group corresponding to a position at which a sum of probability distributions for existence of a left start point located within a distance corresponding to the width of the lane from a position of each candidate start point of the right group is largest.

7. The lane detection method of claim 1, wherein the selecting the left end point and the right end point comprises:
   selecting a left candidate end point of a third line intersecting a largest number of the candidate control points as the left end point from among third lines connecting the left start point with the respective candidate end points; and
   selecting a right candidate end point of a third line intersecting a largest number of the candidate control points as the right end point from among third lines connecting the right start point with the respective candidate end points.

8. The lane detection method of claim 1, wherein the selecting the left end point and the right end point comprises:
   selecting, as the left end point, a left candidate end point of a left third line having a largest number of the candidate control points existing within left and right distances from the left third line from among left third lines connecting the left start point with the respective candidate end points; and
   selecting, as the right end point, a right candidate end point of a right third line having a largest number of the candidate control points existing within left and right distances from the right third line from among right third lines connecting the right start point with the respective candidate end points,
   wherein the left and right distances from the left third line are perpendicular to a gradient of the left third line, and
   wherein the left and rights distances from the right third line are perpendicular to a gradient of the right third line.

9. The lane detection method of claim 8, wherein the selecting the left end point and the right end point further comprises filtering non-connected candidate end points, from among the candidate end points, that are not to be connected with either of the left start point or the right start point by using a road map.

10. The lane detection method of claim 9, wherein the selecting the left end point and the right end point further comprises filtering the candidate end points based on road pattern information extracted from the road map.

11. A lane detection system comprising:
    a feature point extractor configured to extract feature points of a driving lane from an input road image;
    a control extractor configured to extract candidate start points and candidate end points from candidate control points selected from among the feature points; and
    a lane detector configured to select a left start point and a right start point of the driving lane from among the candidate start points based on information about a width of the driving lane, and select a left end point and a right end point of the driving lane from among the candidate end points based on a number of the candidate control points between each of the left start point and the candidate end points and the right start point and the candidate end points.

12. The lane detection system of claim 11, further comprising an image converter configured to generate a conversion image obtained by performing a bird's-eye view conversion of the input road image,
    wherein the feature point extractor is further configured to extract the feature points from the conversion image.

13. The lane detection system of claim 11, wherein the control extractor comprises:

a line generator configured to detect a straight-line pattern between the feature points and generate a first line based on the detected straight-line pattern;

a candidate control point setter configured to set a pair of the feature points which form respective end points of the first line as the candidate control points;

a candidate start point selector configured to select, as a candidate start point, a point on a second line extending from the first line along a same gradient as the first line; and a candidate end point selector configured to select, as a candidate end point, an uppermost candidate control point from among candidate control points in a detection region set from a candidate control point paired with the candidate start point from among the candidate control points.

14. The lane detection system of claim 13, wherein the candidate start point selector is further configured to select, as the candidate start point, a point at which a line located at a position indicating a start of a road intersects the second line.

15. The lane detection system of claim 13, wherein the detection region extends from the candidate control point paired with the candidate start point in a direction opposite to an extending direction of the second line, and comprises a same gradient as that of the second line and a width corresponding to a sum of left and right distances from the candidate control point paired with the candidate start point, and wherein the left and right distances are perpendicular to the gradient of the second line.

16. The lane detection system of claim 11, wherein the lane detector comprises:

a classifier configured to classify the candidate start points into a left group and a right group; and a start point selector configured to select a candidate start point of the right group as the right start point, the candidate start point of the right group corresponding to a position at which a sum of probability distributions for existence of a right start point located within a distance corresponding to the width of the driving lane from a position of each candidate start point of the left group is largest, and select a candidate start point of the left group as the left start point, the candidate start point of the left group corresponding to a position at which a sum of probability distributions for existence of a left start point located within a distance corresponding to the width of the driving lane from a position of each candidate start point of the right group is largest.

17. The lane detection system of claim 11, wherein the lane detector comprises an end point selector configured to select, as the left end point, a left candidate end point of a third line intersecting a largest number of the candidate control points from among third lines connecting the left start point with the respective candidate end points, and select, as the right end point, a right candidate end point of a third line intersecting a largest number of the candidate control points from among third lines connecting the right start point with the respective candidate end points.

18. The lane detection system of claim 11, wherein the lane detector comprises an end point selector configured to select, as the left end point, a left candidate end point of a left third line having a largest number of the candidate control points existing within left and right distances from the left third line from among third lines connecting the left start point with the respective candidate end points, and select, as the right end point, a right candidate end point of a right third line having a largest number of the candidate control points existing within left and right distances from the right third line from among third lines connecting the right start point with the respective candidate end points, wherein the left and right distances from the left third line are perpendicular to a gradient of the left third line, and wherein the left and rights distances from the right third line are perpendicular to a gradient of the right third line.

19. The lane detection system of claim 18, wherein the end point selector is further configured to filter non-connected candidate end points, from among the candidate end points, that are not to be connected with either of the left start point or the right start point by using a road map.

20. The lane detection system of claim 19, wherein the end point selector is further configured to filter the candidate end points based on road pattern information extracted from the road map.

* * * * *